(No Model.)
A. RODEFELD.
TOOL FOR CUTTING PIPE.
No. 598,159.  Patented Feb. 1, 1898.
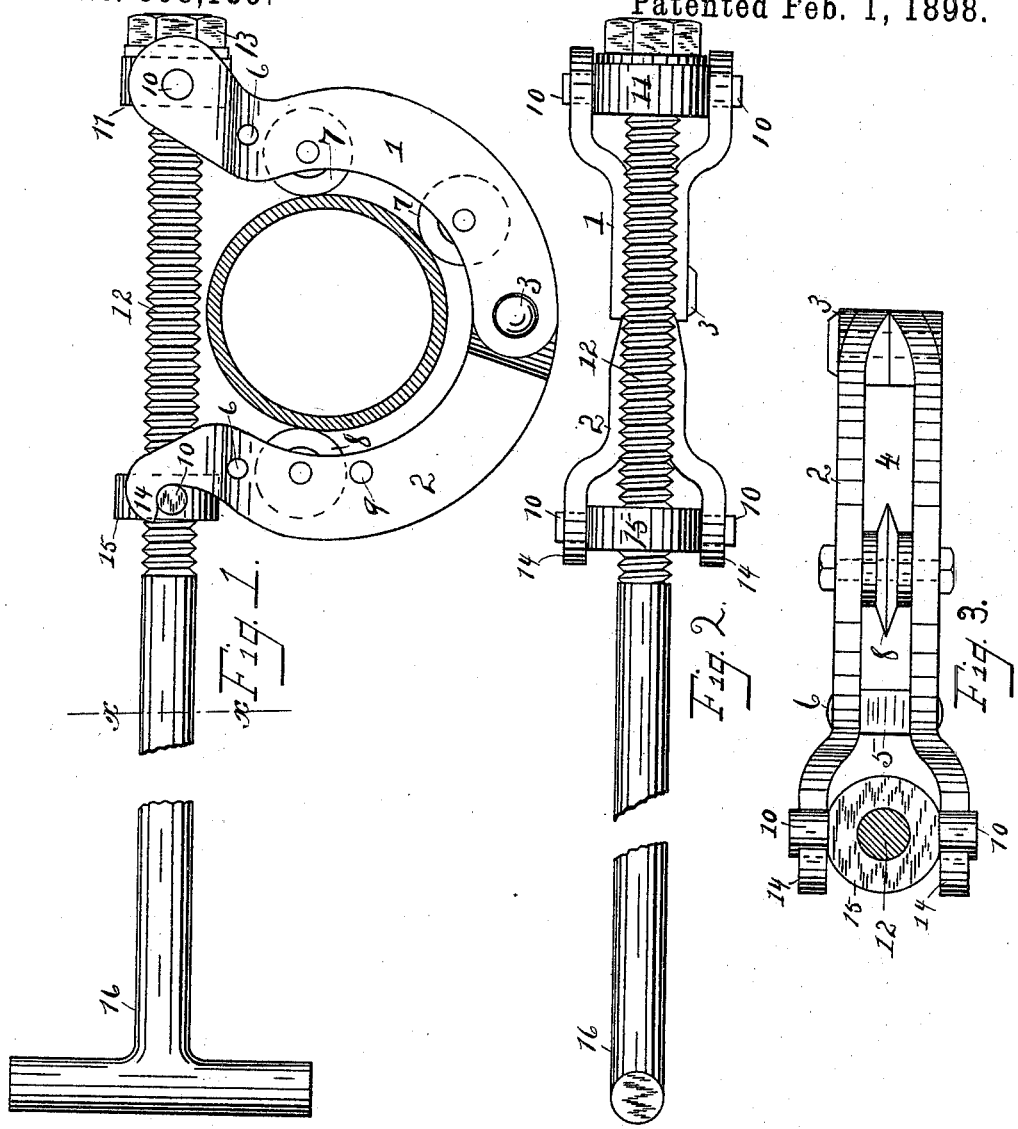
WITNESSES
Charles B. Nevin
Wm Voss
August Rodefeld,
INVENTOR
By R. J. McCarty
ATTORNEY

UNITED STATES PATENT OFFICE.

AUGUST RODEFELD, OF RICHMOND, INDIANA.

TOOL FOR CUTTING PIPE.

SPECIFICATION forming part of Letters Patent No. 598,159, dated February 1, 1898.

Application filed November 22, 1897. Serial No. 659,386. (No model.)

*To all whom it may concern:*

Be it known that I, AUGUST RODEFELD, a citizen of the United States, residing at Richmond, in the county of Wayne and State of Indiana, have invented certain new and useful Improvements in Tools for Cutting Pipe; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to new and useful improvements in pipe-cutters.

The object of the invention is to provide a pipe-cutter that is so constructed that its operating handle or screw lies wholly on one side of and at a right angle to the cutter-jaws, as shown in Figure 1, so that the implement is adapted to cut pipe in inaccessible places—such, for example, as are underground or close to a wall. This is possible by so constructing the tool that the cutter-jaws lie wholly on one side of the operating screw or handle.

To this end the invention consists of two cutter-jaws having a hinged connection, and one of said jaws having a permanent pivotal connection at its other end to the operating screw or handle, and the other of said jaws having a detachable connection at its other end to said screw or handle, as hereinafter more fully described.

Referring to the accompanying drawings, Fig. 1 is a side elevation of my improved pipe-cutter. Fig. 2 is an edge view of the same; and Fig. 3 is a view on the line $x\ x$, Fig. 1.

The cutter-jaws 1 and 2 are hinged at 3, and each of said jaws consists of two curved pieces held apart to provide intervening spaces 4 by blocks 5, which are secured in position by rivets or bolts 6. In one of the jaws there are mounted two rotary cutters 7, and the other has one such cutter 8, with adjacent journal-openings 9 to change the position of said cutter when necessary. The jaw 1 has an outwardly-extended end that is pivotally mounted on bearings or trunnions 10, that project from opposite sides of a nut 11, that is held in a fixed position on the extreme end of the operating handle or screw 12 by a nut 13.

The jaw 2 is movable and has its end curved inwardly and terminating in hooks 14, which engage with similar bearings or trunnions 10, that project from opposite sides of a nut 15 on said screw. The latter nut is movable on said screw, or rather a movement of the screw drives the nut to adjust the jaw 2 to the various sizes of pipe—from three and a half to six inches in diameter.

The screw 12 terminates in a handle 16, by which it is turned to drive the nut 15, as above stated, in or out on said screw, the former movement being required to bring the movable jaw 2 in a proper position to bring the cutters in contact with the pipe and the latter movement having the opposite effect. During the turning of the said screw or handle the nut 15 is prevented from turning by the hooks 14. In disengaging the cutters or jaws from contact with the pipe the nut 15 is moved sufficiently out by turning the handle to permit the said hooks to be uncoupled from the trunnions 10 on said nut, after which the jaws are enabled to be drawn from under the pipe, if the latter is in the ground, or removed from around the pipe. Also in placing the cutter around the pipe the link or jaw 2 is first uncoupled from the nut 15.

As shown in Fig. 1, the plane of the operating handle or screw may be the surface of the ground and the jaws and pipe be below the surface of the ground in a trench no wider than the cutter. In this position a movement of said operating-handle in a half-circle to a position to the right of that shown in said figure and in the same plane will move the cutters entirely around the circumference of the pipe, a half-rotation of the cutter-jaws being all that is necessary to cut the pipe, and, further, by connecting the cutter-jaws and the operating-handle in this manner a greater leverage is obtained.

Having described my invention, I claim—

1. A pipe-cutter comprising a screw-threaded operating-handle, a fixed and a movable nut on said handle with trunnions projecting from opposite sides thereof, two hinged jaws one of which has a pivotal connection with the trunnions on said fixed nut, and the other of said jaws having its engaging end terminating in hooks to engage with the trunnions on said movable nut, and rotating cutters mounted in said jaws, substantially as shown and described.

2. In a pipe-cutter, the combination with an operating-handle, of the cutter-jaws 1 and 2 having a hinged connection, and the latter of said jaws having hooks on the end opposite the hinged end thereof, a fixed and a movable nut on said operating-handle, with the former of which the said jaw 1 has a connection, and with the latter of which the hook end of jaw 2 is detachably connected, and rotating cutters mounted in said jaws, substantially as and for the purposes specified.

In testimony whereof I affix my signature in presence of two witnesses.

AUGUST RODEFELD.

Witnesses:
W. T. DENNIS,
A. M. GARDNER.